Figure 1A:
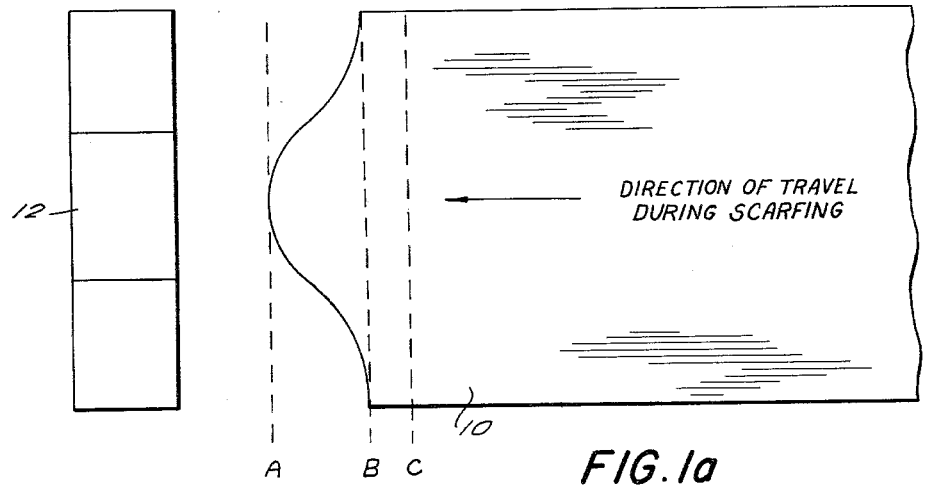

Jan. 18, 1966 A. R. WANDELT 3,230,116
MOVING END STARTS IN MECHANIZED SCARFING
Filed Oct. 23, 1964 3 Sheets-Sheet 1

INVENTOR.
ALLAN R. WANDELT
BY Richard S. Shreve Jr.
ATTORNEY

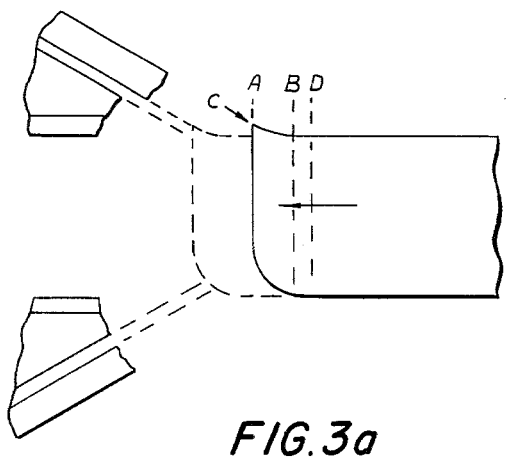
FIG.3a
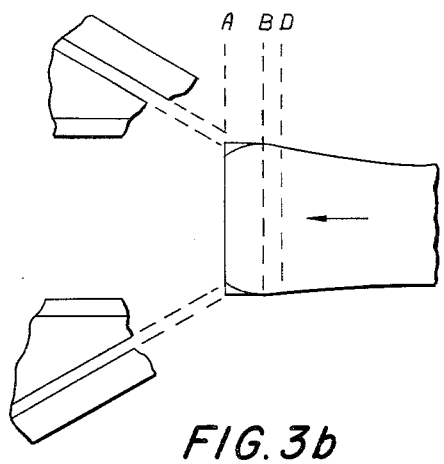
FIG.3b
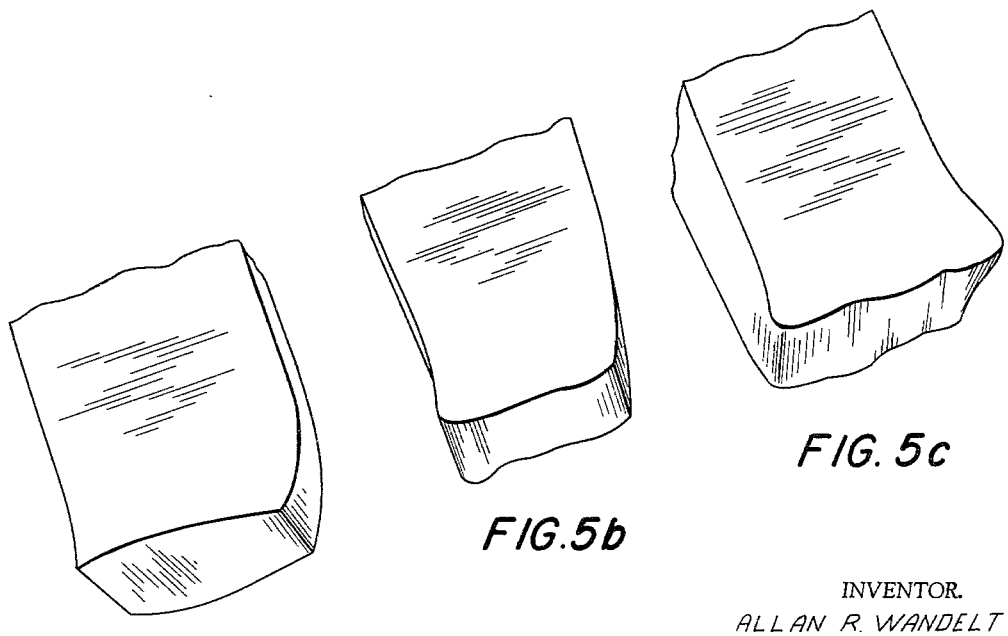
FIG.5a
FIG.5b
FIG.5c

Jan. 18, 1966 A. R. WANDELT 3,230,116
MOVING END STARTS IN MECHANIZED SCARFING
Filed Oct. 23, 1964 3 Sheets-Sheet 3

INVENTOR.
ALLAN R. WANDELT
BY
Richard S. Shreve Jr
ATTORNEY

United States Patent Office 3,230,116
Patented Jan. 18, 1966

3,230,116
MOVING END STARTS IN MECHANIZED SCARFING
Allan R. Wandelt, Cranford, N.J., assignor to Union Carbide Corporation, a corporation of New York
Filed Oct. 23, 1964, Ser. No. 410,843
11 Claims. (Cl. 148—9)

This application is a continuation-in-part of application Serial No. 204,819, filed June 25, 1962, now abandoned.

This invention relates to mechanized scarfing, and more particularly to a scarfing method whereby the scarfing operation may be started at the very edge or end of a steel slab, bloom, billet, ingot or round.

In mechanized scarfing, there are two main types of applications; hot scarfing directly in the rolling mill line, and cold scarfing independent of the rolling mill line. While there are certain inherent differences in the two types of scarfing, there is one problem they have in common; namely, the problem of starting the scarfing reaction at the end of the steel material so as to effect the scarfing of the entire length of the piece.

Standard practice is to position the steel so as to start the scarfing reaction in from the end. Thus, there is always a section of differing length at the beginning end of the steel that remains unscarfed. This unscarfed section must either be cut off and discarded or surface conditioned separately. One of the causes of this inability to start the scarfing reaction at the end of the steel is the inherent irregularities in the configuration of the front end of the steel material to be scarfed.

It is therefore the main object of the present invention to start the scarfing operation at the very end of the oncoming steel despite irregularities therein.

Another object is to start the scarfing reaction at the very end of the oncoming steel without stopping relative movement between the steel and the scarfing unit for preheating thereby providing a method for making a moving end start on the steel.

According to one embodiment of the present invention a workpiece is fed toward a scarfing unit at a low rate of speed. A sheet-like flame containing adjuvant iron powder is formed forward of the scarfing unit and directed at an acute dihedral angle to the surface to be scarfed so that it strikes the forward end of the workpiece. A thermochemical reaction is thereby started on the end surface of the workpiece which is carried over the edge onto the surface to be scarfed, as the workpiece continues to move at low speed. In so doing, a slag puddle is formed transversely across the surface to be scarfed, which will sustain the reaction on such surface as the workpiece continues to move. Thereafter a sheet-like stream of high pressure scarfing oxygen is directed against the surface to be scarfed while the speed of the workpiece is increased to a normal scarfing value.

When scarfing hot or cold carbon steel the flow of adjuvant iron powder can be discontinued as soon as the high pressure scarfing oxygen has been turned on and the workpiece brought to normal scarfing speed. When scarfing hot or cold stainless steel, however, the flow of adjuvant iron powder should be left on.

Initially the workpiece is moved toward the scarfing unit at a low rate of speed. When the workpiece is cold carbon steel this speed is preferably between 5 and 12 feet per minute. In the case of hot carbon steel, however, this initial speed may be as high as 60 feet per minute. When the workpiece is hot or cold stainless steel the initial speed is preferably between 5 and 12 feet per minute.

The normal scarfing speed to which the workpiece will be increased to from the initial starting speed will also vary with the temperature and composition of the workpiece. When scarfing hot carbon steel, this speed will usually be between 100 and 400 feet per minute whereas in cold carbon steel and hot and cold stainless steel scarfing the speed will usually be between 30 and 90 feet per minute.

Although the process as briefly described above and as described in more detail hereinafter makes reference to the workpiece moving toward a scarfing unit it is to be understood that relative movement between the workpiece and the scarfing unit is the true requirement. For example, the process will be equally effective if the workpiece remains stationary while the scarfing unit moves toward it at a low rate of speed until the slag puddle is formed transversely over the surface to be scarfed. Thereafter the speed of the scarfing unit over the workpiece would be increased to a normal scarfing value.

The scarfing units employed may be of either the premixed or postmixed type, although the post mixing type is preferred because it presents fewer safety hazards.

Figure 1B:
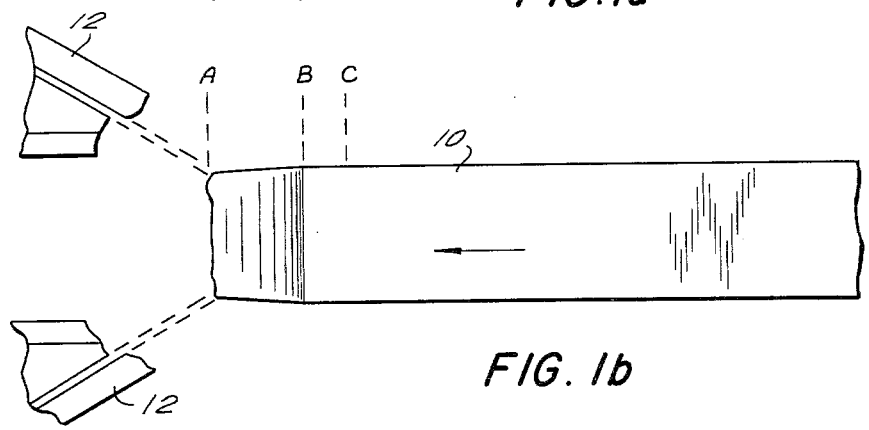
Figure 2:
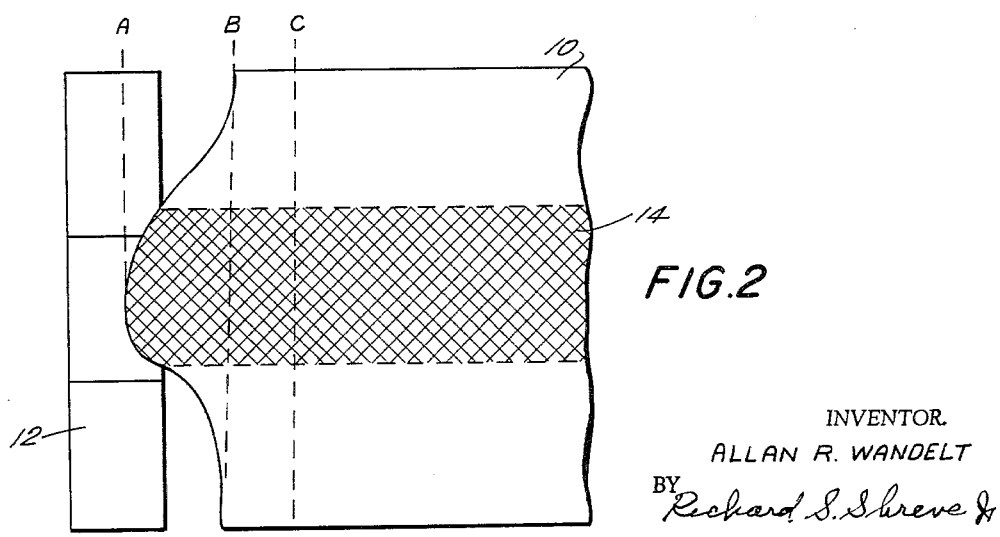
Figure 4A:
Figure 4B:
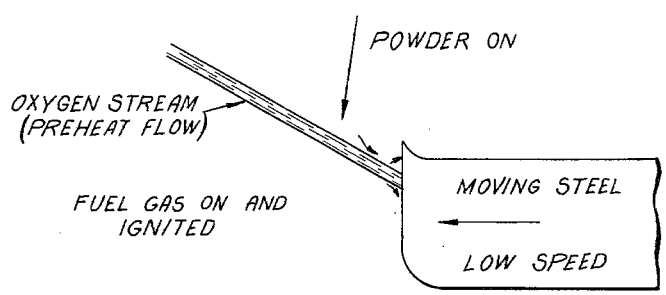
Figure 4C:
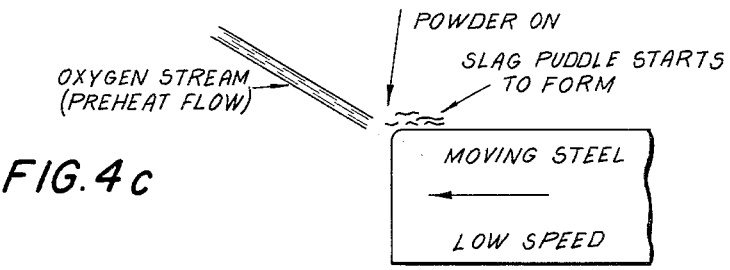
Figure 4D:
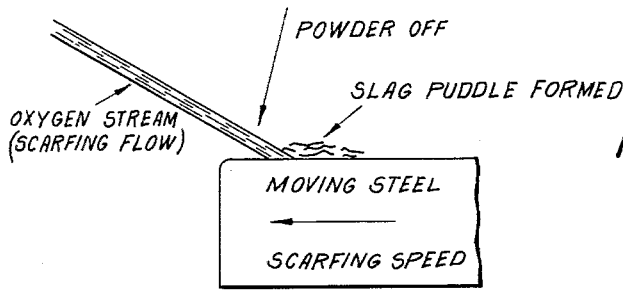

In the drawings:

FIG. 1a is a diagrammatic plan of a slab and desurfacing heads before shearing and at the time of scarfing;
FIG. 1b is a diagrammatic side elevation of the same;
FIG. 2 is similar to FIG. 1 after scarfing is started;
FIG. 3a is a diagrammatic plan similar to FIG. 1b but showing a sheared bloom;
FIG. 3b is a top plan of FIG. 3a;
FIG. 4a is a diagram of light up flow before the steel reaches the scarfing units;
FIG. 4b is a diagram with the powder flow turned on;
FIG. 4c is a diagram with the slag puddle started;
FIG. 4d is a diagram with the roll table travel increased to normal speed;
FIG. 5a is a perspective view of a sheared unscarfed bloom;
FIG. 5b is a similar view of a bloom scarfed on all four sides simultaneously according to the end starting method of the present invention; and
FIG. 5c is a similar view of another similarly scarfed bloom.

Heretofore, in hot scarfing directly in the rolling mill line, the material is normally scarfed directly after coming from the rolling mill and usually before the product is sheared. FIGS. 1a and b illustrate the usual front end configuration of a slab 10 before shearing and at the time of scarfing. In the conventional mechanized scarfing operation, it is necessary to move the slab 10 so that the scarfing units 12 are at a point beyond section B toward section C before the scarfing reaction is started. This is necessary so that the reaction will start all around the periphery of the slab 10. If the scarfing units were positioned in front of section B during preheating, the puddle of molten metal necessary to start the reaction would form only across that portion of the slab that is in contact with the reactive preheat gases as shown in FIG. 2. As soon as the scarfing oxygen and table movement are turned on, the reaction will move forward with very little tendency to spread sidewards. In effect, only the center section 14 of the slab, cross section in FIG. 2, would be scarfed. The outside portions and the edges would remain unscarfed.

Therefore, the slab is positioned so that the scarfing reaction will start at a point C beyond section B. The slab is stopped, preheat fuel gases are turned on and the section beyond B is brought to the ignition point. As the ignition point is reached, scarfing oxygen is turned on and the slab advances through the scarfing machine at a preset speed.

The method outlined above has a number of disadvantages. A section of the slab between section A and section C will remain unscarfed. This unscarfed section will either be scrapped and reduce the yield of the product or will be conditioned separately, adding to the time and cost of conditioning.

Another disadvantage of the above method involves the time it takes for preheating before the scarfing reaction can be initiated, this will range from 5 to 15 seconds depending on the temperature of the slab and the type of product, and the time it takes to carefully position the slab so that the unscarfed section will be held to a minimum. The above method does not lend itself to automation of the process because of the necessity for selecting the point on the slab at which the reaction can be started and still cover the full periphery of the slab and at the same time hold the unscarfed section to a minimum.

The second type of scarfing application concerns cold scarfing of sheared, flame cut, or saw cut billets, blooms and slabs, and scarfing of ingots as cast, and scarfing of flame cut or saw cut rounds. This type of scarfing is carried out away from the mill roll line at a separate installation. The basic problems as outlined in the first case, hot mechanized scarfing in the rolling mill line, hold true with slight variations. FIGURES 3a and b illustrate the end configuration of a sheared bloom. This configuration is the same for sheared billets and slabs.

Under present scarfing procedure, the reaction on the top surface, for example, of the bloom in FIGS. 3a and b can be started near section A, and with careful, time-consuming positioning can probably be started along the sharp corner C. In order to start at corner C, the positioning of the bloom with respect to the scarfing unit cannot vary more than 1/8". However, if the top unit is positioned to start at corner C, the bottom unit will start on the rounded corner of the bloom with the result that the high pressure scarfing oxygen from the bottom unit will blow molten slag in all directions and will very likely damage the scarfing units.

The usual practice at present is to position the scarfing units so that the reaction will start between section B and section D where the shape of the bloom is regular. FIGURE 5a shows the end configuration of a sheared, unscarfed bloom. Once the bloom has been positioned so that the reaction will start between section B and section D, preheat gases, powder, cutting oxygen and bloom travel are brought on in proper sequence to start and maintain the scarfing reaction over the full length of the bloom. This method has numerous disadvantages. Positioning normally takes 5–6 seconds, and preheating with powder takes an additional 3 seconds for a total time loss of 8–9 seconds before the reaction begins.

Furthermore, the unscarfed end between section A and the point where the reaction starts near section D is in many cases cut off as scrap or conditioned separately. Both solutions are costly and time consuming. Assuming that the length of the unscarfed end from section A to the start is about 2 inches and the bloom is 100 inches long, which is not uncommon, the metal loss alone due to scrapping the unscarfed end will be 2 percent.

From the above, it will be obvious that considerable savings in product and time could be realized if a method were devised that would permit starting the scarfing operation at the very end of the steel despite irregularities. Also, being able to make this start while the steel is moving would be advantageous because it would eliminate the time for positioning.

According to the present invention, such a method has been devised which provides for starting the scarfing operation on the very end of the steel and to continue the scarfing operation without stopping for preheating or positioning.

Basically, the novel starting method of the invention is the result of the discovery that good quality scarfing can be accomplished on hot and cold carbon steel and on hot and cold stainless steel at relatively low speeds with only slightly more than the normal oxygen flow used during preheating to sustain the scarfing reaction, while employing adjuvant iron powder at least during the starting phase of the scarfing cycle.

When scarfing cold carbon steel and hot and cold stainless steel, it is conventional practice to utilize iron powder to facilitate initiating the scarfing reaction. An excess of low pressure oxygen is used in order to provide sufficient oxygen to react with the iron powder to effect the start. It has been found, according to the present invention, that by increasing this low pressure oxygen flow by approximately 20 to 30%, it is possible to not only start the scarfing reaction but to carry the reaction along with no damaging slag blow back into the scarfing unit even when the start is made on the irregular end surface of a moving bloom or slab. Once the scarfing reaction has been initiated and there is no longer any danger of the cutting oxygen stream impinging against the end surface of the bloom or slab, the speed is increased to a normal scarfing value and high pressure oxygen is used to complete the scarfing of the full length of the bloom or slab.

For example, all four sides of a cold carbon steel bloom, 6" x 6", were scarfed for the full length of the bloom using the method of the invention for end-starting. Four post-mixed continuous slot scarfing units, of the type disclosed in Patent No. 2,838,431, with attached powder nozzles similar to those disclosed in Patent No. 2,754,234 were used. The procedure for starting the scarfing operation at the very end of the cold carbon steel bloom according to the invention is as follows.

The steel approaches the scarfing units at a roll table speed of between 5–12 f.p.m. Referring to attached FIG. 4a, before the steel reaches the scarfing units, and the path of the oxygen stream is approximately as indicated, the light up oxygen flow is turned on. Since the particular scarfing units used in this example are of the single continuous slot post-mixed type, the light up flow of oxygen, the preheat oxygen, and the cutting oxygen all exit from the continuous slot in the scarfing unit. The fuel gas, exiting through rows of ports above and below the continuous slot, mixes with the preheat oxygen to form the preheat flames.

When the steel has reached position shown in FIG. 4b, the fuel gas (with acetylene, a flow of approximately 85–170 c.f.h. per inch of steel surface width is used), is turned on and ignited, the low pressure oxygen flow is increased from light up flow to a flow just sufficient to maintain the scarfing reaction at a low speed; this flow is between 1700 and 2300 c.f.h. per inch of steel surface width to be scarfed when the powder flow is turned on. All of this takes place in a matter of 2 to 3 seconds before the oxygen stream impinges on the end adjacent the surface to be scarfed, e.g. adjacent the top corner of the steel, where the start is to take place.

The powder (about 20 oz. per minute per inch of steel surface width to be scarfed is used), injected into the oxygen stream, is there ignited and the burning powder, carried by the oxygen stream to the steel, raises the steel to its ignition temperature. The start of the scarfing reaction takes place upon the end surface of the steel as the steel continues its travel, as shown in FIG. 4c, and carries over the corner, building up a slag puddle transversely across the surface to be scarfed, to sustain the reaction as it goes. Once the slag puddle is formed and scarfing is taking place, the powder flow is turned off.

The travel speed of the steel, approximately 5–12 f.p.m., is slow enough so the preheat oxygen flow carries the scarfing reaction along until there is no longer any danger of slag being blown back off the end into the scarfing units. At this point, as shown in FIG. 4d the roll table travel speed is increased to normal scarfing speed (approximately 30 to 90 f.p.m., depending upon the depth to be removed) and the high pressure cutting oxygen flow normally used for scarfing is turned on, i.e. a flow of about 3300–5000 c.f.h. per inch of steel surface width to be scarfed.

FIG. 5a shows an unscarfed bloom having a typical sheared irregular end. FIGS. 5b and 5c show two blooms which have been scarfed on all four sides simultaneously using the end starting method of the invention, the ends shown being the end where the scarfing operation was initiated. As the figures illustrate, there is no unscarfed section at the beginning, the entire bloom being surface conditioned in the one operation.

Normally, powder is not used for starting the scarfing reaction in scarfing hot carbon steel. However, we have found that the moving end starts of the invention can be achieved with hot carbon steel by combining the addition of powder to start the reaction with the increased preheat oxygen flow to carry the reaction, as outlined above for cold carbon steel. The same applies for achieving moving end starts on hot and cold stainless steel, except that the flow of powder is continued during scarfing.

A preheat oxygen flow of approximately 200 c.f.h. per inch of steel surface width with the continuous slot scarfing unit is used in the conventional method of starting when scarfing hot carbon steel where preheat times of 5 to 15 seconds are required. By adding powder (about 20 oz. per minute per inch of steel surfaces width) and increasing this preheat oxygen flow to between 1200 and 1700 c.f.h. per inch of steel surface width to supply sufficient excess oxygen to both react with the powder and carry the reaction until the normal scarfing oxygen flow is turned on, it is possible to achieve the moving end starts of the invention on hot carbon steel at roll table speeds of up to approximately 60 f.p.m., depending on the steel temperature.

Further, with the discovery that good quality scarfing can be accomplished at relatively low speeds and with only slightly more than the normal flow of preheat oxygen, it is possible to make end starts on materials with regular, straight ends such as saw cut or flame cut ends. By careful positioning, the oxygen stream and powder stream can be made to impinge on all four edges of the material at the same time. The starting procedure after this initial positioning is similar to that used to make moving starts on material with irregular ends; fuel gas, low pressure preheat oxygen and powder are turned on simultaneously. As soon as the material to be scarfed reaches the ignition temperature, the low table speed (5–12 f.p.m. for cold carbon steel and hot and cold stainless steel scarfing and up to 60 f.p.m. for hot scarfing) is brought on until the scarfing reaction progresses until there is no danger of slag being blown back off the end. After this point, normal scarfing oxygen flow is turned on and table speed is increased to 30–90 f.p.m. for cold carbon and hot and cold stainless steel scarfing and 100–400 f.p.m. for hot scarfing. Thereafter, the powder flow can be discontinued on the hot and cold carbon steel scarfing.

Although preferred embodiments of this invention have been described in detail, it will be appreciated that modifications may be made without departing from the spirit and scope of the invention. For example, scarfing units other than the post-mixed continuous slot type may be employed. The invention can be employed when scarfing one or more surfaces of the steel.

What is claimed is:

1. Method of thermochemically scarfing the surface of a moving steel workpiece which comprises feeding the workpiece toward a scarfing unit at a low rate of speed, forming forward of said scarfing unit a sheet-like flame containing adjuvant iron powder, directing said flame at an acute dihedral angle to said surface to be scarfed so as to strike the forward end of the workpiece, to start a thermochemical reaction on said end which will be carried over the edge of said surface and impinge upon said surface as the workpiece continues to move toward the scarfing unit, thereby forming a slag puddle extending transversely across said surface to sustain said reaction as the workpiece continues to move, thereafter directing a sheet-like stream of high-pressure scarfing oxygen against said surface for scarfing the remainder thereof while increasing the speed of said workpiece to a normal scarfing value.

2. Method as claimed in claim 1 wherein the flow of said adjuvant iron powder is discontinued after said high pressure scarfing oxygen stream is directed against said surface to be scarfed.

3. Method as claimed in claim 1 wherein said workpiece is cold carbon steel which is initially fed toward the scarfing unit at a speed of 5–12 feet per minute until said reaction is carried onto the surface to be scarfed.

4. Method as claimed in claim 1 wherein said workpiece is stainless steel which is initially fed toward the scarfing unit at a speed of 5–12 feet per minute until said high pressure scarfing oxygen stream is directed against the surface to be scarfed, and wherein said flow of adjuvant iron powder is continued during the scarfing of said remainder of the workpiece.

5. Method of thermochemically scarfing a surface area of a metal workpiece having ends forming transverse corners, which comprises feeding the workpiece toward a scarfing unit, initiating a flow of a sheet of preheat oxygen at an acute dihedral angle to said surface in the direction of feeding; turning on a flow of fuel gas and a flow of adjuvant powder into said preheat oxygen and igniting the same before the forward end corner of the workpiece reaches the scarfing unit so as to form sheet-like flames which strike said forward end below the upper corner thereof, to start the scarfing reaction as the workpiece continues to travel and carry the reaction up over the corner, and impinge upon said surface at said dihedral angle thereby building up a slag puddle extending transversely over said surface to sustain the reaction as it goes therefrom, cutting off the flow of adjuvant powder, and turning on a sheet-like flow of the high pressure cutting oxygen for scarfing the remainder of the workpiece.

6. Method of thermochemically scarfing the surface of a workpiece which comprises moving a scarfing unit toward a workpiece at a low rate of speed, forming forward of said scarfing unit a sheet-like flame containing adjuvant iron powder, directing the powder-containing flame at an acute dihedral angle to said surface so as to strike the forward end of said workpiece, to start a thermochemical reaction on said end which will be carried over the edge of said surface and impinge upon said surface as the scarfing unit continues to move, thereby forming a slag puddle extending transversely across said surface to sustain said reaction as the scarfing unit continues to move, thereafter directing a sheet-like stream of high pressure scarfing oxygen against said surface for scarfing the remainder thereof while increasing the speed of said scarfing unit to a normal scarfing value.

7. Method as claimed in claim 6 wherein said scarfing unit is of the pre-mixed type and is moved at a starting speed of 5–12 feet per minute until said reaction has started and said high pressure scarfing oxygen is directed against said surface.

8. Method as claimed in claim 3 wherein the flow of low pressure preheat oxygen is 20–30 percent above the normal preheat oxygen flow employed in cold carbon steel scarfing.

9. Method as claimed in claim 8 in which the low pressure preheat oxygen flow is between 1700 and 2300 c.f.h. per inch of steel surface width to be scarfed.

10. Method as claimed in claim 1 in which the body to be scarfed has square ends permitting a low speed, low oxygen pressure start after positioning the material such that the oxygen and powder streams impinge uniformly upon the four edges of said material.

11. Method of thermochemically scarfing a surface area of a metal workpiece having sawed ends, which comprises feeding the workpiece toward a scarfing unit, initiating a flow of preheat oxygen streams at an acute dihedral angle to said surface in the direction of feeding, turning on a flow of fuel gas and a flow of adjuvant powder into said preheat oxygen and igniting the same before the forward end of the workpiece reaches the scarfing unit so as to form high temperature flames which strike said forward end, to start the scrafing reaction as the workpiece continues to travel and carry the reaction up over the edge and impinge upon said surface at said dihedral angle thereby building up a slag puddle extending transversely over said surface to sustain the reaction as it continues therefrom, cutting off the flow of adjuvant powder, and turning on a flow of high pressure cutting oxygen for scarfing the remainder of the workpiece.

References Cited by the Examiner

UNITED STATES PATENTS

| | | | |
|---|---|---|---|
| 2,288,026 | 6/1942 | Rea | 148—9 |
| 2,483,479 | 10/1949 | Smith et al. | 148—9.5 |
| 2,493,802 | 1/1950 | Bucknam et al. | 148—9.5 |
| 2,627,826 | 2/1953 | Meincke | 148—9 |

DAVID L. RECK, *Primary Examiner.*